United States Patent [19]

Cox et al.

[11] Patent Number: 5,609,896

[45] Date of Patent: Mar. 11, 1997

[54] VITAMIN AUGMENTED RICE COMPOSITE AND METHOD THEREFOR

[76] Inventors: James P. Cox; Robert W. D. Cox, both of 246 E. Bartlett Rd., Lynden, Wash. 98264

[21] Appl. No.: 412,552

[22] Filed: Mar. 29, 1995

[51] Int. Cl.$^6$ .............................. A23L 1/0532; A23L 1/29
[52] U.S. Cl. .................. 426/72; 426/73; 426/93; 426/99; 426/102; 426/319; 426/541; 426/573; 426/629; 426/640; 426/654
[58] Field of Search .................. 426/72, 73, 93, 426/99, 102, 319, 541, 573, 629, 640, 654

[56] References Cited

U.S. PATENT DOCUMENTS

| | | | |
|---|---|---|---|
| 2,835,584 | 5/1958 | Rosenberg | 426/629 |
| 3,431,112 | 3/1969 | Durst | 426/629 |
| 4,765,996 | 8/1988 | Misaki et al. | 426/99 |
| 5,252,351 | 10/1993 | Cox et al. | 426/629 |

*Primary Examiner*—Helen Pratt
*Attorney, Agent, or Firm*—Christensen O'Connor Johnson & Kindness PLLC

[57] ABSTRACT

Vitamin augmented rice composites and methods include ground rice, vitamin, a binding agent, a cross-linking agent for setting the binding agent, an antioxidant, a moisture barrier agent and an aqueous agent. The binding agent is most preferably algin, the cross-linking agent is most preferably a calcium source, the vitamin is most preferably vitamin A, the antioxidant is most preferably vitamin E, the moisture barrier agent is most preferably lard, and the aqueous agent is most preferably water.

60 Claims, No Drawings

VITAMIN AUGMENTED RICE COMPOSITE AND METHOD THEREFOR

BACKGROUND OF THE INVENTION

Rice is the pre-eminent food for the bulk of the global community. Neither natural rice nor "instant" rices contain sufficient nutrients to be life-sustaining if used as the sole source of food. This deficiency is more marked for active persons, old persons and children who, for differing reasons, need to be certain that each unit of food taken in provides a maximum amount of nutritional benefit.

Natural milled rice and "instant" rice contain little, if any, fiber and are, with the exception of carbohydrate, deficient in every other class of important nutrient, including protein, fat, vitamins and minerals. The Total Energy Profile (TEP) is markedly inadequate to sustain life in the three to five year old age category. U.S. Government programs have been developed over the past decades to distribute a considerable proportion of the country's grain surpluses to needy areas of the world. These surpluses include rice. The surpluses are used not only to fight malnutrition but are also employed as hunger relief in areas of periodic and chronic starvation. Problems have arisen in the areas where rice has been distributed as a major source of total food intake due to deficiency of macro and micro nutrients such as vitamin A, iron, calcium and phosphorus. Many unfortunate circumstances of permanently damaged vision and blindness continue to be reported from areas where rice is employed as a principle foodstuff. The damage is particularly serious among the young and old who are usually most dependent on such foods. Anemia and diseases related to anemic conditions continue to wreak havoc with undernourished and starving people dependent on rice.

In determined attempts to resolve the problem, leaders and scientists at U.S. government agencies have sought methods to combat the foregoing problems. None have yet been successful. Attempts have been made to enrobe or coat the grains, or to soak the necessary nutrients into them. Vitamins and minerals coated on or soaked into rice grains are more readily destroyed because the major destructive forces, light and exposure to air, are at work on the surface. To add to the problem, many foreign cultures prescribe scrupulous washing of rice grains and/or cooking in copious volumes of water before eating. Much, if not all, of the fortifications are thus washed away. Finally, for unprocessed raw rice grains, long cooking is required to make them edible, further destroying any fortifications which have survived to that point.

Reduced cost is vital to feeding the maximum number of hungry. A concentrated, pre-mixed product like native grains, but containing very large amounts of vitamins, could be mixed throughout the bulk of natural grains to ensure an adequate vitamin fortification of the grains. In order to qualify for this use, the concentrate grain must be stable and must protect the added nutrients from degrading processes product during preparation, storage and transportation.

For use by destitute persons, the rice product should be able to be consumed and digested with the use of very little or no fuel. There is virtually no place in the world outside of the developed countries where rice is not recognized as the primary foodstuff. It has been claimed that 25% of the world's calories come from rice. Two billion people (about ½ the world population) depend on rice for 80% of their food.

The need for nutritionally improved, stable, ready to eat or low energy-requiring, inexpensive, traditional rice grain analogues to serve the function of hunger relief cannot be over-emphasized. The inability to cross cultural barriers has resulted in the failure of most notable attempts, such as Incaparina, Pronutro, and Peruvita, at resolving hunger relief. The products were simply not recognized as food, were mistrusted, or seemed to break some obscure or unaccounted-for cultural taboo of the recipient. The present invention now makes possible omnipreparational and nutrient-stable rice grain products which are made substantially from rice grains and selected nutrients, including micro and macro nutrients and even medicines, in a form which will be recognized within the limits of specific cultural expectations and be readily acceptable.

U.S. Pat. Nos. 4,844,936 and 5,252,351 issued to Cox describe the use of grain, cereal, seeds, legumes and leafy vegetables mixed with a settable gel to form a quick-cooking product. Due to steam and oxidation from drying encountered in production and required preparation, nutrients are unavoidably degraded, the product is not nutrient-stable and does not protect many important nutrients which could otherwise be added. These products are not ready to eat per se, but are hot, liquid, rehydratable products.

Products produced according to these Cox patents are destructive of, and can not stabilize many, important nutrients which might be added due to factors such as oxidation, steaming, cooking and leaching during processing. The process requires more or less complete gelatinization (cooking), rinsing, freezing and major drying steps. Moreover, these products will lose some edible texture and will partially disintegrate when cooked, such as when included in single course prepared foods such as casseroles, or when prepared by boiling. The products of these patents are, by comparison, also more expensive to make than products made according to the present invention.

U.S. Pat. Nos. 2,914,005 and 3,071,471 issued to Gorozpe disclose the use of broken or malformed rice grains to form quick-cooking rice product, but do not disclose the use of alginates or other binders. The products proposed by Gorozpe do not provide a reconstituted rice grain which, upon preparation, is similar to natural rice. The products produced according to Gorozpe disintegrate into a paste when cooked. Moreover, they cannot be eaten uncooked, prepared merely by the addition of liquids, cooked for periods of time required by natural rice grains, or over-cooked. They do not provide protection for, or give stability to, added nutrients.

U.S. Pat. No. 4,101,683 issued to Kamada discloses the use of alginates, among other polysaccharides, in connection with puffed rice, but not with broken or malformed rice grains; nor is the reconstitution of grains to form an edible product disclosed. The product proposed by Kamada cannot be eaten uncooked, prepared by the addition of hot or cold fluids, cooked like a natural rice grain, or over-cooked without losing the character of the natural rice grain. The Kamada product is not a reconstituted rice grain made from flour and does not look like, taste, or otherwise mimic natural rice. The Kamada product cannot incorporate important nutrients and medicines, and cannot sequester important additives to protect them from natural degeneration. The Kamada product is brown, irregular, and lacks the rice grain shape. When cooked, the Kamada product is slimy, tastes abnormal, and unrice-like. .Finally, the Kamada product (due mainly to puffing) is quite expensive to produce.

U.S. Pat. No. 4,352,976 issued to Harrow discloses the use of an extruder to re-form gelatinized and un-gelatinized flour into a rice product. Harrow does not disclose the use of algin or binders. The Harrow product is deficient for the same reasons as is Gorozpe.

A United States patent issued to Lechthaler discloses the use of rice flour in combination with alginates and a setting bath. The Lechthaler product is not omnipreparational. It can be prepared only within a narrow range of preparation parameters. It is not ready to eat uncooked, or upon the addition of liquids. It cannot be cooked like natural rice grains or over-cooked. Due to high pressure heat encountered in production, the Lechthaler product is not nutrient-stable and results in degradation of many added nutrients such as vitamins, medicines, hydroxy keto analogues, oils and fats, for example.

None of the prior art proposes the inclusion of phosphate salts in formed rice grains or bits as an alternative to the addition of starch decomplexing and neutralizing agents. None proposes reacting the formed grain or bit for brief periods at high temperatures at or near the melting point of starches. None proposes abbreviated and inexpensive drying accomplished by processing at high temperatures for brief periods of time followed by extracting moisture with brief voluminous exposure to fluid, usually air, but sometimes an inert gas. None proposes the saturation of grain or bit components with inert fluid, such as nitrogen, to prevent oxidative degeneration of labile additives such as vitamin A.

No known prior art proposes omnipreparational reconstituted rice grains. No known prior art proposes production and preparation methods for formed grains or bits for protecting important sequestered nutrients and food additives.

A principal objective of the present invention is to provide reconstituted rice grain, grain-based bit and grain products and analogues that are ready to eat uncooked and/or when prepared by a wide variety of means and methods.

Another principal objective is to produce and maintain important life-supporting, omnipreparational and nutrient-stable rice bits including grains with additives which can be stabilized, as well as rice analogues which retain nutrients over much longer periods of time and wider ranges of circumstances than normally possible by treating native rice externally.

An important objective is to provide reconstituted grain, grain analogue or grain product that has amplified or improved organoleptic properties over that of natural whole grains.

A specific object is the use of by-products of natural foods, such as broken grains, bits or malformed grains to manufacture whole grain, grain analogue, or composite bit products.

An important objective is to provide a product that protects and stabilizes delicate and important food additives, such as proteins, protein derivatives, lipids, vitamins, minerals, fats, and/or pharmaceuticals, or medicines to prolong their useful life throughout transportation and storage, and to protect them from being destroyed or lost during washing and/or preparation.

A specific object is to provide a rice grain product which is nutritionally balanced such that it may be eaten as a sole ration for life support or diet control.

Another object is to provide a rice product which has restored, enhanced, intensified and sometimes new flavors and aromas.

A further object of the invention is to provide a rice grain analogue, grain-based or grain bit product that can have nutritional value equal to or greater than natural whole grains.

An important object is to provide an inexpensive method of producing bit grains, grain analogues or bit products made substantially from grains, grain hybrids and grain products, particularly with respect to drying.

A valuable object is to provide high starch-bearing bit products which, when eaten, will digest more slowly and evenly than native starch to assure controlled release of converted sugars systemically in aid of those with metabolic disorders, the health minded, and athletes.

SUMMARY OF THE INVENTION

This invention relates to manufactured rice products which may be made substantially from rice powder and which in form, shape and character may be very similar to natural rice grains. The rice products may be used as carriers, imparting stability to added nutrients, and may be made to contain large amounts of nutritionally important fortifications integrally within the bit or grain, such as vitamins, minerals, proteins, amino acids, amino acid precursors such as hydroxy keto analogues and fats, including nutritionally advantageous additions of other foodstuffs, and even medicines. Very delicate additives may first be sequestered, such as by micro-encapsulation, before inclusion into products, or included and then the bit or grain encapsulated. Important nutritional additives can be incorporated into grains in very high concentrations while sustaining very little, if any, degradation. Finished bits or grains can be used as high vitamin or mineral pre-mix concentrates to be distributed in small percentages in natural grains, such as those distributed to the needy as hunger relief food. Products can be made life sustaining, requiring little or no cooking. Important additives heretofore very sensitive to destruction by heat, oxidation, rancidity, ultraviolet radiation, and leaching can be protectively sequestered in the rice product or analogue and thereby be made more stable to storage, shipment, and preparation.

In the present invention, rice grains, preferably broken, cracked, misshapen or otherwise degraded, are selected to represent an appropriate ratio of amylose to amylopectin required for a particular desired end product. The rice is ground into flour. The rice flour is mixed with fortifications such as vitamins (preferably vitamin A), minerals, and/or medicines. One or more binders are added to the rice flour, which include solubilized proteins, polysaccharides, acacia, casein, carrageenan, gelatins, methylcellulose, gums (such as guar), hydrocolloids (such as algin), and cationic and anionic material such as sodium alginates, low methoxypectins and the like. A vitamin antioxidant selected from the group consisting of ascorbic acid, alpha-tocopherol, butylated hydroxyanisole (BHA), sodium bisulfite, potassium bisulfite, lecithin and gallate esters is added. Also added to the flour is a moisture barrier agent which prevents the vitamin from migrating to the surface of the finished product where it would undergo oxidation. The moisture barrier agent is preferably lard, coconut fat, palm oil, saturated oil, or stearates. Unsaturated oils are not preferred because they attract free oxygen. After hydration, the resulting dough is compressed with a screw press or the like and is extruded as grain-shaped pieces through a pasta extruder, twin screw high pressure extruder, pellet mill, or compression die or the like. The rice pieces are then wetted or dusted with cross-linking agents such as edible aldehydes, titanium sources, polyvalent cations, calcium sources (dicalcium phosphate, calcium chloride or calcium lactate, for example), hydrochloric acid, volatile acids, coacervates, protein, ammonia, gelatin, albumin, glyceraldehyde, oxazolidine, alum and the like. Heat may also be employed as a cross-linking agent. Additionally, the cross-linking agent can be mixed into the rice flour with the binder if one or both are heat-activated or if a release retardant system is employed.

Preferably one or more gasses selected from the group consisting of nitrogen and carbon dioxide is added to the rice flour and resulting dough to displace oxygen in order to reduce oxidation of the added vitamin. Also, the processing preferably takes place in the absence of ultraviolet light to prevent ultraviolet degradation of the vitamin. Most preferably, the vitamin is protected from heat-induced degradation by the addition of a heat stabilizing agent selected from the group consisting of sodium bisulfite, potassium bisulfite, lithium bisulfite, sodium metabisulfite, potassium metabisulfite, lithium metabisulfite, sodium hydrosulfite, potassium hydrosulfite, lithium hydrosulfite, sodium sulfoxylate, zinc sulfoxylate, sodium sulfonate, lithium sulfate, copper sulfate, zirconium sulfate, zinc sulfate, potassium sulfate, iron sulfate, hydrogen sulfite, potassium sulfite, sodium sulfite, and lithium sulfite.

DETAILED DESCRIPTION OF THE PREFERRED EMBODIMENTS

I. OVERVIEW

A. Vitamin Augmented Rice Flour.

In the present invention, rice grains, preferably broken, cracked, misshapen or otherwise degraded, are selected to represent an appropriate ratio of amylose to amylopectin required for a particular desired end product. The rice is ground into flour. The rice flour is mixed with fortifications such as vitamins (preferably vitamin A), minerals, and/or medicines.

B. Binder.

One or more binders are added to the rice flour, which include solubilized proteins, polysaccharides, acacia, casein, carrageenan, gelatins, methylcellulose, gums (such as guar), hydrocolloids (such as algin), and cationic and anionic material such as sodium alginates, low methoxypectins and the like.

C. Prevention of Oxidation, Ultraviolet Degradation and Heat Degradation of Vitamins.

A vitamin antioxidant selected from the group consisting of ascorbic acid, alpha-tocopherol, butylated hydroxyanisole (BHA), sodium bisulfite, potassium bisulfite, lecithin and gallate esters is added. Also added to the flour is a moisture barrier agent which prevents the vitamin from migrating to the surface of the finished product where it would undergo oxidation. The moisture barrier agent is preferably lard, coconut fat, palm oil, or other saturated oil, or stearate. Unsaturated oils are not preferred because they attract free oxygen.

Preferably one or more gasses selected from the group consisting of nitrogen and carbon dioxide is added to the rice flour and resulting dough to displace oxygen in order to reduce oxidation of the added vitamin. Also, the processing preferably takes place in the absence of ultraviolet light to prevent ultraviolet degradation of the vitamin. Most preferably, the vitamin is protected from heat induced degradation by the addition of a heat stabilizing agent selected from the group consisting of sodium bisulfite, potassium bisulfite, lithium bisulfite, sodium metabisulfite, potassium metabisulfite, lithium metabisulfite, sodium hydrosulfite, potassium hydrosulfite, lithium hydrosulfite, sodium sulfoxylate, zinc sulfoxylate, sodium sulfonate, lithium sulfate, copper sulfate, zirconium sulfate, zinc sulfate, potassium sulfate, iron sulfate, hydrogen sulfite, potassium sulfite, sodium sulfite, and lithium sulfite.

D. Grain Formation.

The resulting dough is compressed with a screw press or the like and is extruded as grain-shaped pieces through a pasta extruder, twin screw high pressure extruder, pellet mill, or compression die or the like. A heat pump providing between about 200° F. and about 550° F. of thermodynamic energy is employed to drive the phosphorylation reaction that results in stable anhydrous gelatinization of the product. The heat employed in phosphorylation may also be the cross-linking agent of the above binder.

E. Cross-Linking Agent.

Heat may be employed as a cross-linking agent. When heat is not the cross-linking agent, the rice pieces are wetted or dusted with cross-linking agents such as edible aldehydes, titanium sources, polyvalent cations, calcium sources (dicalcium phosphate, calcium chloride or calcium lactate, for example), hydrochloric acid, volatile acids, coacervates, protein, ammonia, gelatin, albumin, glyceraldehyde, oxazolidine, alum and the like. Additionally, the cross-linking agent can be mixed into the rice flour with the binder if one or both are heat-activated or if a release retardant system is employed. The release rate of the cross-linking agent (calcium sulfate or calcium carbonate, for example) is determined by the relative concentrations of the release retardant hexametaphosphate and adipic acid.

II. SPECIFIC EXAMPLES

The following example formulas following represent a variety of products which offer entirely new characteristics over native rice and prior art synthetic rice.

The following example has been tested for use as a premix in grains shipped to underdeveloped countries and hunger relief areas. It maybe fortified with 100 times or more of the average low or non-existent concentrations of vitamin A found in rice. The product can be made as an analogue for any grain and even new composite adventitious grain combinations but when used as a concentrate for rice is indistinguishable from the normal grains and may be readily intermixed with bulk grains prior to shipping or may be judiciously added to whole grains just before preparation by the consumer. The product is extremely stable, stands up to copious rinsing common to some cultures, is able to withstand any of a wide form of preparation techniques, and does not degrade during shipping or preparation. In these respects, omnipreparational grain products are unique and have long been sought by various governments and U.S. government agencies to overcome the vexing problems associated with important and vital programs designed to benefit in their entirety rather than vitiate hunger only to inflict eye damage, blindness and death from anemia induced disease.

EXAMPLE 1:

|  | Preferred Amount (Weight %) | Allowed Range (Weight %) |
| --- | --- | --- |
| Group 1: | | |
| Rice flour | 70.94% | 50.00–75.00% |
| Sodium Alginate (binding agent) | 1.14% | 0.25–5.00% |
| Sodium Metabisulfite (heat stabilizer) | 0.02% | 0.00–2.00% |
| Vitamin A (vitamin) | 0.37% | 0.01–5.00% |
| Ascorbic Acid (antioxidant) | 0.41% | 0.01–2.00% |
| Group 2: | | |

|  | Preferred Amount (Weight %) | Allowed Range (Weight %) |
| --- | --- | --- |
| Lard (moisture barrier agent) | 0.43% | 0.00–5.00% |
| Corn Oil (lubricant) | 0.19% | 0.00–5.00% |
| DL - Alpha Tocopherol (vitamin E) (antioxidant) | 1.42% | 0.00–5.00% |
| BHA (antioxidant) | 0.06% | 0.01–1.00% |
| Sodium Alginate (binding agent) | 0.38% | 0.00–3.00% |
| Water | 24.64% | 20.00–35.00% |
| Group 3: |  |  |
| Calcium Chloride (cross-linking agent) (by weight of the dry rice product) | 2.00% | 0.25–5.00% |
| Water | 6.00% | 0.75–15.00% |

The rice employed is selected from one or more of any type, including long grain, short grain, basmati, pecan, sweet, black, pearl, brown rice and wild rice. The rice is ground to flour in, for example, a conventional food blender or grain mill. The sodium alginate, sodium metabisulfite and ascorbic acid are mixed into the rice flour (Group 1).

The vitamin A is next added to the rice flour composition, just prior to the addition of the ingredients listed below. Lard, corn oil and BHA are heated to liquid (about 100° F.) and blended with water, additional sodium alginate and vitamin E (Group 2). This liquid mixture is blended with the above dry rice flour mixture to form a dough which is extruded through a food extruder (e.g., pasta extruder such as La Parmigiana D45) to form discrete rice-shaped dough kernels. Water is heated to 160° F. and calcium chloride is dissolved therein (Group 3). This calcium chloride solution is sprayed on the kernels, which are then dried at ambient conditions for about twelve hours.

In order to remove all interstitial oxygen from the dry ingredients (such as rice flour) and all free oxygen from the liquid ingredients (such as water), which causes oxidation of the vitamin, the oxygen is displaced by an inert gas purge using, for example, nitrogen or carbon dioxide. The inert gas purge is performed on dry ingredients by flushing the air space of the dough mixer apparatus with the selected gas for sufficient time to adequately substitute the ambient gas with the selected purge gas. The inert gas purge is conducted on liquid ingredients by subjecting the water to vacuum pressures greater than 26 inches of mercury.

The specific rice type, binding agent, heat stabilizer, vitamin, antioxidant, moisture barrier agent, lubricant and cross-linking agent used in Example 1 are exemplary only, and any of the other disclosed members of one or more of these groups can be employed instead of the specific member of the group employed in Example 1. Additionally, some groups, such as the heat stabilizer and the lubricant, are only optionally included and can be omitted entirely.

EXAMPLE 2:

The Relative Dose Response Test (RDR) was used to assess the bio-availability of vitamin A in a stabilized form in the artificially produced rice kernels of Example 1. The vitamin A proved stable to storage and cooking, and the enriched rice was nontoxic, and had the same sensory characteristics of ordinary rice. The nutrified rice, cooked with sugar and milk, was offered to 83 deprived children as the challenge dose for an RDR test. The children showed positive and negative tests in agreement with their serum retinol levels. The regression of RDR on serum retinol levels was the same as that observed when the conventional RDR test was applied.

Rice flour made from broken rice grains was mixed with all-trans retinyl palmitate (type VI, Sigma Chemical Co., St. Louis, Mo.), and with a small amount of corn oil and lard of food grade quality. Alpha-tocopherol (Spectrum Chemical, Gardena, Calif.), BHA (Van Waters and Rogers, Seattle, Wash.) and ascorbic acid (Sigma Chemical Co.) were used at 1 mg/gram.

Initially, the stability of the Example 1 kernels to storage and cooking was determined, both in the Example 1 kernels alone and after mixing with ordinary rice at a ratio of 2/100.

The Example 1 kernels were stored up to 180 days, protected from direct light in a cool place, at about 26° C. (about 0.7). Suitable samples produced the following results, in µg retinol/gram (mean±SD; n in parenthesis): 872.8±37.5 (9), 662.7±31.6 (16), 618.5±11.8 (24) and 630.8±6.3 (24) at days 0, 37, 71 and 180 respectively. During these storage times, moisture varied from 12.2 to 12.4%. Initial loss was about 25% of the vitamin A content, after which the values stabilized. The loss of vitamin A under normal rice cooking conditions (=5 minutes boiling followed by 20–25 minutes under low heat), was 25.9±9.1% (n=70).

The consumption of 25 grams (raw weight) of cooked kernels of Example 1 per day during twenty days produced no adverse effect detectable by clinical examination or standard laboratory evaluation (serum retinol, glycemia, hemogram, blood urea, serum total protein, serum lipids) on one adult volunteer.

Next, the acceptability of enriched rice was tested. Fourteen food panelists responded to a questionnaire regarding differences between enriched and non-enriched rice (difference test). No statistically significant difference in taste was found. A second questionnaire asked panelists to evaluate separately the sensory properties of enriched and non-enriched rice (preference test). A two-tail Mann-Whitney test showed a significant (U=31, $\alpha$=0.002) preference for nutrified rice.

An excess of retinol binding protein (RBP) accumulates in the liver when there is not sufficient vitamin A for the synthesis of holo-RBP. This excess RBP is released to circulation (as holo-RPB) by the administration of a small (450–1000 retinol equivalents) dose of vitamin A ("AROVIT"). Pre- and post-challenge dose serum retinol values can be compared indirectly to show the status of the liver reserves of the vitamin (the RDR test). If the RDR test shows a response of greater than 20% (vitamin A level before fasting versus vitamin A level after fasting), the subject has tested positive for vitamin A deficiency. This RDR test was employed to ascertain whether the vitamin A in the rice composite of the present invention was bio-available. If a statistically similar number of vitamin A deficient subjects tested positive under the RDR test when given the rice composite of the present invention when compared to the administration of "AROVIT" vitamin A, the RDR test would prove the bio-availability of the vitamin A in the rice composite of Example 1.

Eighty three children aged 11–77 months, of a Municipal day-care center in Recife, Brazil ("Menino Jesus") were selected for the study.

Following an overnight fast, 5 milliliters of blood were taken from a suitable ante-cubital vein. The children were fed a standardized breakfast of a cheese sandwich, coffee with milk, and a measured amount of enriched rice cooked with milk and sugar in the form of a popular dessert, familiar to these children ("arroz doce", sweet rice). The portion contained 1,500 IU vitamin A (450 µg or 1.57 µmol of retinol). A second sample was drawn five hours later, as previously described.

Serum total vitamin A was determined by spectrophotometric procedures with precautions to ensure the quality of samples prior to analysis. Complete ultraviolet bleaching, linearity, extraction and the composition of the bleached and non-bleached, saponified and non-saponified extracts were verified by HPLC. All blood samples were immediately taken to the laboratory and analyzed. The Example 1 kernels and the raw enriched rice were ground to a fine powder. The powder, as well as cooked samples of the Example 1 kernels or enriched rice, were thoroughly homogenized with a 50% solution of glycerol in water. Suitable aliquots of the homogenate were saponified with 1N alcoholic KOH, and retinol was then extracted with hexane for analysis by spectrophotometry and HPLC. The RDR was calculated by the standard procedure:

$$RDR = 100 \times \frac{A_5 - A_0}{A_5}$$

where $A_5$ is the vitamin A level five hours after the challenge dose and $A_0$ is the fasting value.

Standard statistical procedures were used with the aid of appropriate software ("STAT-GRAPHICS", MIT, Cambridge, Mass., and "SYSTAT" Evanston, Ill.) to calculate summary statistics, correlation parameters, and probabilities of statistical significance.

Bio-availability:

The RDR test was positive (i.e., response greater than 20%) in 48 of 83 subjects. Serum retinol levels were below the proposed cutoff point of 1.05 μmol/L (30 μg/dL)) in 43 of the 48 children with a positive RDR (Table 1). Regression analysis showed a highly significant negative correlation between basal retinol levels and RDR. Parameters of the regression curve were virtually the same as similar data from a study using "AROVIT" vitamin A on 470 randomly selected deprived children: intercept 73.2±4.7 vs. 75.1±2.1, slope −45.8±4.1 vs. −42.8±1.6; r −0.77 vs. −0.78.

TABLE 1

Frequency distribution of basal serum retinol levels and RDR

| | Serum retinol, μmol/L | | | | |
|---|---|---|---|---|---|
| | 0–0.35 | 0.36–0.70 | 0.71–1.05 | 1.05–1.40 | >1.40 |
| n | 1.00 | 14.00 | 32.00 | 22.00 | 14.00 |
| RDR > 20% | 1.00 | 14.00 | 28.00 | 5.00 | 0.00 |

While particular embodiments of the present invention have been described in some detail herein above, changes and modifications may be made in the illustrated embodiments without departing from the spirit of the invention.

We claim:

1. A vitamin augmented rice composite comprising:
rice particles;
vitamins;
a heat stabilizing agent;
a binding agent;
a cross-linking agent for setting said binding agent; and
an aqueous agent.

2. The rice composite of claim 1 wherein said rice comprises from about 50 percent by weight to about 75 percent by weight, said vitamin comprises from about 0.01 percent by weight to about 10 percent by weight, said binding agent comprises from about 0.25 percent by weight to about 8 percent by weight, said cross-linking agent comprises from about 0.25 percent by weight to about 5 percent by weight, and said aqueous agent comprises from about 20.75 percent by weight to about 50 percent by weight of said composite.

3. The rice composite of claim 2 wherein said rice comprises about 70.9 percent by weight, said vitamin comprises about 0.3 percent by weight, said binding agent comprises about 1.5 percent by weight, said cross-linking agent comprises about 2.0 percent by weight, and said aqueous agent comprises about 23.0 percent by weight of said composite.

4. The rice composite of claim 1 wherein said rice is selected from the group consisting of long grain, short grain, basmati, pecan, sweet, black, pearl, brown rice and wild rice.

5. The rice composite of claim 1 wherein said binding agent is selected from the group consisting of solubilized proteins, acacia, casein, carrageenan, polysaccharides, gelatins, methylcellulose, gums, hydrocolloids, and alginates and low methoxypectins.

6. The rice composite of claim 5 wherein said binding agent is algin.

7. The rice composite of claim 1 wherein said cross-linking agent is selected from the group consisting of edible aldehydes, titanium sources, polyvalent cations, calcium sources, hydrochloric acid, volatile acids, coacervates, protein, ammonia sources, gelatin, albumin, glyceraldehyde, oxazolidine, alum and heat.

8. The rice composite of claim 7 wherein said cross-linking agent is calcium chloride.

9. The rice composite of claim 1 wherein said aqueous agent is water.

10. The rice composite of claim 1 wherein said heat stabilizer is selected from the group consisting of sodium bisulfite, potassium bisulfite, lithium bisulfite, sodium metabisulfite, potassium metabisulfite, lithium metabisulfite, sodium hydrosulfite, potassium hydrosulfite, lithium hydrosulfite, sodium sulfoxylate, zinc sulfoxylate, sodium sulfonate, lithium sulfate, copper sulfate, zirconium sulfate, zinc sulfate, potassium sulfate, iron sulfate, hydrogen sulfite, potassium sulfite, sodium sulfite, and lithium sulfite.

11. The rice composite of claim 10 wherein said heat stabilizer is sodium metabisulfite.

12. The rice composite of claim 1 wherein free oxygen in said composite has been replaced with a gas selected from the group consisting of nitrogen and carbon dioxide.

13. The rice composite of claim 12 wherein said gas is nitrogen.

14. The rice composite of claim 1 wherein said composite is formed in the absence of ultraviolet light.

15. A vitamin augmented rice composite comprising:
rice particles;
vitamin;
a binding agent;
a cross-linking agent for setting said binding agent;
an antioxidant;
a moisture barrier agent
an aqueous agent; and
a heat stabilizing agent.

16. The rice composite of claim 15 wherein said rice comprises from about 50 percent by weight to about 75 percent by weight, said vitamin comprises from about 0.01 percent by weight to about 10 percent by weight, said binding agent comprises from about 0.25 percent by weight to about 8 percent by weight, said cross-linking agent comprises from about 0.25 percent by weight to about 5 percent by weight, said antioxidant comprises from about 0.01 percent by weight to about 8 percent by weight, said moisture barrier comprises from about 0 percent by weight to about 5 percent by weight, said aqueous agent comprises from about 20.75 percent by weight to about 50 percent by weight, and said heat stabilizing agent comprises from about 0 percent by weight to about 2 percent by weight of said composite.

17. The rice composite of claim 16 wherein said rice comprises about 70.9 percent by weight, said vitamin comprises about 0.3 percent by weight, said binding agent comprises about 1.5 percent by weight, said cross-linking agent comprises about 2.0 percent by weight, said antioxidant comprises about 1.9 percent by weight, said moisture barrier comprises about 0.4 percent by weight, said aqueous agent comprises about 23.0 percent by weight, and said heat stabilizing agent comprises about 0.02 percent by weight of said composite.

18. The rice composite of claim 15 wherein said rice is selected from the group consisting of long grain, short grain, basmati, pecan, sweet, black, pearl, brown rice and wild rice.

19. The rice composite of claim 15 wherein said vitamin is selected from the group consisting of vitamin A and vitamin E.

20. The rice composite of claim 19 wherein said vitamin is vitamin A.

21. The rice composite of claim 15 wherein said binding agent is selected from the group consisting of solubilized proteins, acacia, casein, carrageenan, polysaccharides, gelatins, methylcellulose, gums, hydrocolloids, and alginates and low methoxypectins.

22. The rice composite of claim 21 wherein said binding agent is algin.

23. The rice composite of claim 15 wherein said cross-linking agent is selected from the group consisting of edible aldehydes, titanium sources, polyvalent cations, calcium sources, hydrochloric acid, volatile acids, coacervates, protein, ammonia sources, gelatin, albumin, glyceraldehyde, oxazolidine, alum and heat.

24. The rice composite of claim 23 wherein said cross-linking agent is calcium chloride.

25. The rice composite of claim 15 wherein said antioxidant is selected from the group consisting of ascorbic acid, alpha-tocopherol, butylated hydroxyanisole (BHA), sodium bisulfite, potassium bisulfite, lecithin and gallate esters.

26. The rice composite of claim 25 wherein said vitamin is vitamin E.

27. The rice composite of claim 15 wherein said moisture barrier agent is selected from the group consisting of lard, coconut fat, palm oil, or other saturated oil, or stearate.

28. The rice composite of claim 27 wherein said moisture barrier agent is lard.

29. The rice composite of claim 15 wherein said aqueous agent is water.

30. The rice composite of claim 15 wherein said heat stabilizer is selected from the group consisting of sodium bisulfite, potassium bisulfite, lithium bisulfite, sodium metabisulfite, potassium metabisulfite, lithium metabisulfite, sodium hydrosulfite, potassium hydrosulfite, lithium hydrosulfite, sodium sulfoxylate, zinc sulfoxylate, sodium sulfonate, lithium sulfate, copper sulfate, zirconium sulfate, zinc sulfate, potassium sulfate, iron sulfate, hydrogen sulfite, potassium sulfite, sodium sulfite, and lithium sulfite.

31. The rice composite of claim 30 wherein said heat stabilizer is sodium metabisulfite.

32. The rice composite of claim 15 wherein free oxygen in said composite has been replaced with a gas selected from the group consisting of nitrogen and carbon dioxide.

33. The rice composite of claim 15 wherein said gas is nitrogen.

34. The rice composite of claim 15 wherein said composite is formed in the absence of ultraviolet light.

35. A method of producing a vitamin augmented rice composite comprising the steps of:
  (a) mixing powdered rice, a vitamin, an antioxidant, a moisture barrier agent, a heat stabilizing agent, and liquid to form a dough; and
  (b) forming discrete kernels from said dough.

36. The method of claim 35 further comprising the step of:
  (c) adding a binding agent.

37. The method of claim 36 wherein said binding agent of step (c) is set with a cross-linking agent to set said rice composite.

38. The method of claim 37 further comprising the step of:
  (d) drying said rice composite.

39. The method of claim 38 wherein said binding agent is set during or at any time before step (d).

40. The method of claim 37 wherein said rice comprises from about 50 percent by weight to about 75 percent by weight, said vitamin comprises from about 0.01 percent by weight to about 10 percent by weight, said binding agent comprises from about 0.25 percent by weight to about 8 percent by weight, said cross-linking agent comprises from about 0.25 percent by weight to about 5 percent by weight, said antioxidant comprises from about 0.01 percent by weight to about 8 percent by weight, said moisture barrier comprises from about 0 percent by weight to about 5 percent by weight, and said aqueous agent comprises from about 20.75 percent by weight to about 50 percent by weight of said composite.

41. The method of claim 40 wherein said rice comprises about 70.9 percent by weight, said vitamin comprises about 0.3 percent by weight, said binding agent comprises about 1.5 percent by weight, said cross-linking agent comprises about 2.0 percent by weight, said antioxidant comprises about 1.9 percent by weight, said moisture barrier comprises about 0.4 percent by weight, and said aqueous agent comprises about 23.0 percent by weight of said composite.

42. The method of claim 37 wherein said cross-linking agent is selected from the group consisting of edible aldehydes, titanium sources, polyvalent cations, calcium sources, hydrochloric acid, volatile acids, coacervates, protein, ammonia sources, gelatin, albumin, glyceraldehyde, oxazolidine, alum and heat.

43. The method of claim 42 wherein said cross-linking agent is calcium chloride.

44. The method of claim 36 wherein said binding agent is selected from the group consisting of solubilized proteins, acacia, casein, carrageenan, polysaccharides, gelatins, methylcellulose, gums, hydrocolloids, and alginates and low methoxypectins.

45. The method of claim 44 wherein said binding agent is algin.

46. The method of claim 36 wherein step (c) is performed at any time before step (b).

47. The method of claim 35 wherein said rice is selected from the group consisting of long grain, short grain, basmati, pecan, sweet, black, pearl, brown rice and wild rice.

48. The method of claim 35 wherein said vitamin is selected from the group consisting of vitamin A and vitamin E.

49. The method of claim 48 wherein said vitamin is vitamin A.

50. The method of claim 35 wherein said antioxidant is selected from the group consisting of ascorbic acid, alpha-tocopherol, butylated hydroxyanisole (BHA), sodium bisulfite, potassium bisulfite, lecithin and gallate esters.

51. The method of claim 50 wherein said vitamin is vitamin E.

52. The method of claim 35 wherein said moisture barrier agent is selected from the group consisting of lard, coconut fat, palm oil, or other saturated oil, and stearate.

53. The method of claim 52 wherein said moisture barrier agent is lard.

54. The method of claim 35 wherein said aqueous agent is water.

55. The method of claim 35 wherein said heat stabilizer is selected from the group consisting of sodium bisulfite, potassium bisulfite, lithium bisulfite, sodium metabisulfite, potassium metabisulfite, lithium metabisulfite, sodium hydrosulfite, potassium hydrosulfite, lithium hydrosulfite, sodium sulfoxylate, zinc sulfoxylate, sodium sulfonate, lithium sulfate, copper sulfate, zirconium sulfate, zinc sulfate, potassium sulfate, iron sulfate, hydrogen sulfite, potassium sulfite, sodium sulfite, and lithium sulfite.

56. The method of claim 55 wherein said heat stabilizer is sodium metabisulfite.

57. The method of claim 35 further comprising the step of replacing free oxygen in said composite with a gas selected from the group consisting of nitrogen and carbon dioxide.

58. The method of claim 57 wherein said gas is nitrogen.

59. The method of claim 35 further comprising the step of forming said composite in the absence of ultraviolet light.

60. A vitamin augmented rice composite comprising:

rice particles;

vitamin;

a binding agent;

a cross-linking agent for setting said binding agent; and an aqueous agent wherein free oxygen in said rice composite has been replaced with a gas selected from the group consisting of nitrogen and carbon dioxide to minimize vitamin oxidation.

* * * * *